US005301081A

United States Patent [19]

Podell et al.

[11] Patent Number: 5,301,081

[45] Date of Patent: Apr. 5, 1994

[54] INPUT PROTECTION CIRCUIT

[75] Inventors: Allen F. Podell, Palo Alto; Edward B. Stoneham, Los Altos, both of Calif.

[73] Assignee: Pacific Monolithics, Sunnyvale, Calif.

[21] Appl. No.: 915,348

[22] Filed: Jul. 16, 1992

[51] Int. Cl.$^5$ ........................ H02H 9/00; H02H 9/04; H02H 3/20

[52] U.S. Cl. ........................ 361/56; 361/91; 361/111

[58] Field of Search ........................ 361/56, 54, 58, 91, 361/111; 307/100; 257/355-357, 358-360

[56] References Cited

U.S. PATENT DOCUMENTS

| | | | |
|---|---|---|---|
| 3,777,216 | 12/1973 | Armstrong | 361/56 |
| 4,423,431 | 12/1983 | Sasaki | 361/56 |
| 4,527,213 | 7/1985 | Ariizumi | 361/56 |
| 4,609,931 | 9/1986 | Koike | 361/54 |
| 4,712,152 | 12/1987 | Iio | 361/56 |
| 4,803,527 | 2/1989 | Hatta et al. | 361/91 |
| 4,807,080 | 2/1989 | Clark | 361/56 |
| 4,849,845 | 7/1989 | Schmitt | 361/91 |
| 4,893,157 | 1/1990 | Miyazawa et al. | 257/358 |
| 4,930,036 | 5/1990 | Sitch | 361/56 |
| 5,041,889 | 8/1991 | Kriedt et al. | 361/111 |

OTHER PUBLICATIONS

M. Shifrin et al., "High Power Control Components Using A New Monolithic FET Structure", *IEEE 1989 Microwave and Millimeter-Wave monolithic Circuits Symposium*, pp. 51-56.

*Primary Examiner*—A. D. Pellinen
*Assistant Examiner*—Ronald William Leja
*Attorney, Agent, or Firm*—Edward B. Anderson

[57] ABSTRACT

A depletion-mode MESFET is connected between an RF input terminal and ground. The gate is connected to a negative reference voltage via a bias resistor and to ground via a capacitor. A detector couples the input terminal to the gate and includes first and second series diodes and a second resistor connected from between the first and second diodes to ground. A coil is connected between the input terminal and an output terminal connected to a GaAs integrated circuit. A Schottky diode limiter is connected to the output terminal for limiting the voltage of both positive and negative polarities that leak to the output terminal from the transistor.

8 Claims, 1 Drawing Sheet

INPUT PROTECTION CIRCUIT

BACKGROUND OF THE INVENTION

1. Field of the Invention

This invention relates to devices for protecting the input and output terminals of microwave circuits from excessive voltages. In particular, it relates to such devices having an FET switch selectively shunting the terminal to ground with a gate biasing circuit for controlling operation of the FET.

2. Description of the Prior Art

Devices for limiting the electrical energy reaching a device through one conductor or another, have existed for at least a generation. A common type of these is formed by placing a pair of silicon diodes back-to-back between the line to be protected and ground. When the voltage across the diodes rises above the breakdown threshold, the diodes conduct, shorting the excess power to ground. Some of the energy is reflected back out of the port of entry, some is absorbed in the diodes, and a small amount inevitably leaks through to the device to be protected.

If the incident high-power pulse has a fast rise time, energy can leak past the diodes before they have time to break down. This is termed spike leakage and, with silicon diodes, it can be enough to damage a GaAs MESFET. Since silicon diodes cannot be integrated into a gallium arsenide monolithic circuit, this type of protection would have to be externally connected to the chip to be protected. The additional bulk of the externally connected limiter would defeat the purpose for using GaAs MMICs in many applications such as phased-array radar and would increase the cost of the unit.

An alternate approach is to fabricate a gallium arsenide diode on the chip with the device to be protected. There are two types of semiconductor diodes. One consists of three different layers in which a thin undoped layer is sandwiched between a layer enriched with hole carriers and a layer enriched with electron carriers (the PIN diode). Also, a PN diode would work. This is the same as a PIN diode with an infinitely thin I layer. The other type consists of a film of metal evaporated directly onto a doped semiconductor. If the metal does not dissolve into the semiconductor, this forms a Schottky diode. In general the PIN diode offers a larger volume for absorbing electrical energy than does the Schottky diode. For this reason the PIN diode would be preferred; however, to achieve the speed necessary to function in the microwave regime, the carriers must be electrons and not holes. Therefore GaAs MMICs are always doped with elements that give rise to electrons as the dominant carrier species. To dope a portion of the chip with hole bearing elements in order to make a PIN structure would require additional processing steps and thus increase the cost of the product.

Shunt bipolar transistors are used to suppress transient signals from a power source in lower frequency applications, as is described in U.S. Pat. No. 4,849,845 issued to Schmitt for "Transient Suppressor". With this device, the base of the transistor is controlled by a sense and control circuit to turn the transistor switch on at a first voltage and off when the voltage reaches a level less than the first voltage. A resistor and optionally a diode are in series with the transistor. Such a system requires an elaborate control circuit, requires two transistor circuits for alternating current, and is not functional at microwave frequencies.

A more simple circuit is disclosed in U.S. Pat. No. 5,041,889 issued to Kriedt et al. for "Monolithically Integratable Transistor Circuit for Limiting Transient Positive High Voltages, such as ESD Pulses Caused by Electrostatic Discharges on Electric Conductors". This circuit uses a shunt bipolar transistor with the base biased by the parallel combination of capacitor and resistor connected to the input. A second capacitor connects the base to ground. Besides having the limitations of bipolar transistor operation, it is only functional on positive surges.

In U.S. Pat. No. 4,712,152 entitled "Semiconductor Integrated Circuit Device", Iio discloses the use of parallel NPN bipolar transistors, with bases and emitters connected to ground. The transistors have different breakdown voltages for accommodating power dissipation for different types of surges.

It is also known to use FETs in shunt between an RF input and ground. In U.S. Pat. No. 3,777,216 entitled "Avalanche Injection Input Protection Device", Armstrong discloses the use of an IGFET or MOSFET input shunt with a diode coupling the gate to ground. The IGFET is said to operate in an avalanche mode for one polarity of signal and in a conduction mode in the other polarity. This device requires avalanche breakdown of the drain-gate junction for operation and does not use active biasing.

Miyazawa et al., in U.S. Pat. No. 4,893,157 entitled "Semiconductor Device", disclose using two parallel shunt transistors separated in the signal path by a resistor. One or both of the transistors are IGFETs or MOSFETs. This device also requires the use of both N-type and P-type material, and does not use active biasing.

Sasaki discloses a similar device in U.S. Pat. No. 4,423,431 entitled "Semiconductor Integrated Circuit Device Providing a Protection Circuit". With this device, the gate of an IGFET or MOSFET is biased by a resistor in the input signal path and a capacitor connecting the input to the gate. A resistor, and optionally a parallel capacitor, couple the gate to ground. The silicon gate is said to be fabricated along with the internal circuit to be protected.

Yet another variation is disclosed by Arizumi in U.S. Pat. No. 4,527,213 entitled "Semiconductor Integrated Circuit Device with Circuits for Protecting an Input Section Against an External Surge". This variation requires a MOSFET shunt associated with the output side of each of two series input resistors. One MOSFET has a gate shorted to the drain which is grounded via a resistor. The second MOSFET is the same but without the resistor to ground. Other variations are also shown directly connecting a shunt IGFET gate to the source or leaving the drain unconnected.

Another similar device using two series shunt IGFETs is disclosed by Koike in U.S. Pat. No. 4,609,931 issued for "Input Protection MOS Semiconductor Device with Zener Breakdown Mechanism". As with the device of Sasaki, these devices all require an inline resistor and use of a special diffused region under a MOSFET.

Sitch, in U.S. Pat. No. 4,930,036, discloses an "Electrostatic Discharge Protection Circuit for an Integrated Circuit". This protection circuit uses a shunt MESFET on a signal line after a series resistor. The source and gate are separated by a second series resistor. A normally reversed-biased diode is connected between the FET gate and a low voltage source. The transistor conducts when a positive discharge is applied to the input terminal, and the diode conducts when a negative discharge is applied. This device has a gate-to-channel capacitance in the switch FET that must be charged through the in-line resistor to turn the FET on. This results in a delay in operation of the switch FET after a surge is applied. Further, the FET must be an enhancement-mode type to be off and to avoid degrading the functioning circuit when the input voltage is low.

In "High Power Control Components Using a New Monolithic FET Structure", *IEEE* 1989 *Microwave and Millimeter-Wave Monolithic Circuits Symposium*, pages 51–56, Shifrin et al. disclose three current-limiting devices that use a new monolithic switch FET design that reportedly overcomes the breakdown voltage limitation of a conventional switch FET to increase its power-handling capability. One involves a series connection of FET cells coupling the RF input to ground. The FETs are controlled by a common control signal balanced to make the FETs operate as concurrently as possible. Capacitors are applied between the FETs to compensate for parasitic capacitance. This circuit is reported as being effectively tested at 27 watts, with a similar four-cell device having a power control capability of 40 watts.

Shifrin et al. also disclose a set of FETs in parallel between various points on the input signal line and ground. There is no description of the control scheme, but it reportedly is used to control 40 watts. A third version is summarily discussed as involving a voltage-controlled attenuator with a voltage multiplier and operational amplifier providing voltage detection and feedback.

Specific integrated circuit structures to effect particular protection characteristics are disclosed in U.S. Pat. No. 4,807,080 issued to Clark for "Integrated Circuit Electrostatic Discharge Input Protection", apparently requiring the use of MOSFETs in a breakdown mode, and in U.S. Pat. No. 4,803,527 entitled "Semiconductor Integrated Circuit Device Having Semi-Insulator Substrate" and issued to Hatta et al. The device disclosed in this latter patent has a series resistor in the signal path and a depleted N layer under a floating gate or insulator, for use in conjunction with an associated electrostatic destruction protect circuit.

These FET devices are designed for operation in enhancement mode and most of them are designed to be used on digital or direct current terminals rather than microwave signal lines. There remains a need for a protection circuit using a shunt MESFET that is also operable in depletion mode, has a fast switch time in response to positive and negative power surges, and is able to give protection against large AC signals without significantly degrading the performance of the protected circuit. It is also desirable to have such a device that is self-biasing and is operable for both moderate and high overvoltage conditions, i.e., in ballast and breakdown modes. Further, such a circuit having a simple sense and control circuit is also desirable.

SUMMARY OF THE INVENTION

These features are variously provided in the present invention. An overvoltage protection circuit made according to the invention has a terminal for receiving a signal, and a transistor having a control port, a first current conducting port coupled to the terminal, and a second current conducting port coupled to a common reference potential, such as ground, with a bidirectionally conductive controlled path between the first and second current-conducting ports. A first resistor couples the control port to a second reference potential equal to or lower than the common reference potential for rendering the transistor conductive in a first direction in response to a voltage applied to the terminal of a first polarity. One or more detector diodes are coupled between the terminal and the control port for rendering the transistor conductive in a second direction reverse to the first direction in response to a voltage applied to the terminal of a second polarity opposite to the first polarity. Voltages of both polarities are thereby controlled. With AC voltages at high frequencies applied to the terminal, a capacitor connected from the transistor's control port to the common reference potential can be changed to a DC potential by the rectifying action of the detector diodes such that the transistor becomes conductive continuously. High-frequency voltages are thereby further controlled.

In the preferred embodiment of the invention, the transistor is a depletion-mode MESFET. The diode means coupled between the input terminal and the control port includes first and second series diodes and a resistor connected from between the first and second series diodes to ground.

A coil is connected between the input terminal and an output terminal for coupling to a GaAs integrated circuit. A diode limiter is connected to the output terminal for limiting the voltage of both positive and negative polarities applied to the output terminal to a value less than the corresponding minimum voltages provided by the transistor.

When an excessive negative voltage is applied to the input terminal, the input terminal becomes more negative than the negatively biased gate. Conduction is from ground to the input terminal. During application of an excessive positive voltage, the detector diodes conduct, removing the negative bias from the gate, allowing the transistor to conduct. Thus, both positive and negative peaks are clipped. The limiter diodes further clip any power leaks past the transistor.

These and other features and advantages of the present invention will be apparent from the following detailed description of the preferred embodiment of the invention and as illustrated in the accompanying drawings.

DETAILED DESCRIPTION OF THE PREFERRED EMBODIMENT

Figure 1:
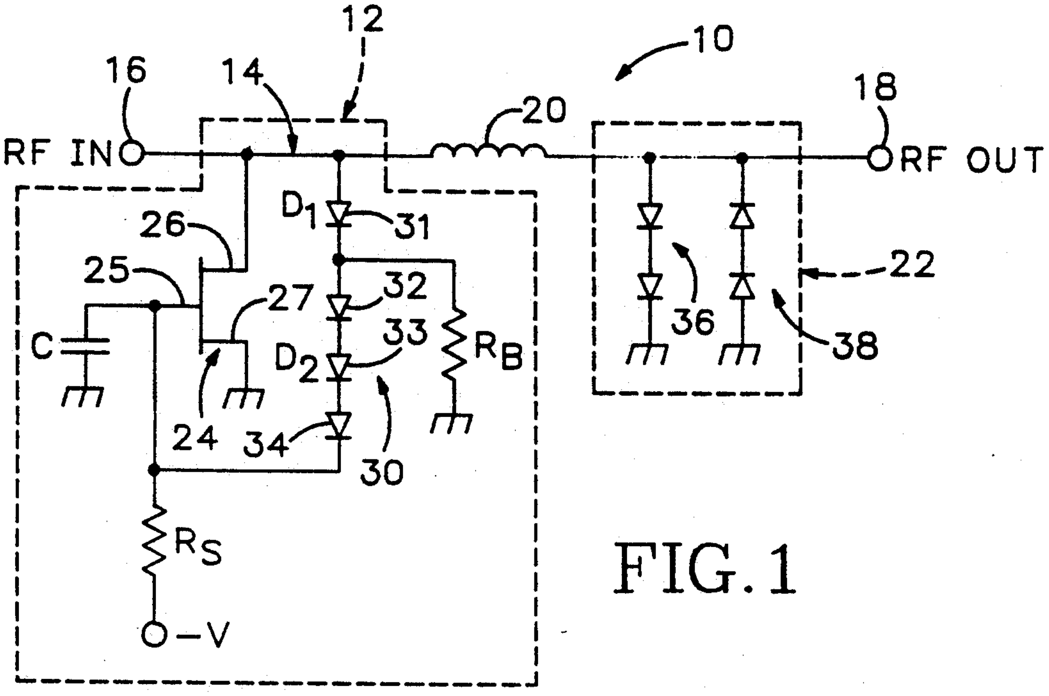
FIG. 1 is a schematic of a circuit input protection device made according to the present invention.

Referring initially to FIG. 1, an input protection device 10 made according to the present invention includes a shunt FET limiter circuit 12 coupled to a microstrip 14 connecting an input terminal 16, for receiving input RF signals, to an output terminal 18 for connection with a GaAs integrated circuit to be protected from excessive voltage in the form of direct current, continuous wave, or pulses. A coil 20 is formed in microstrip 14. A diode limiter circuit 22 is connected to the microstrip between the coil and output terminal.

FET limiter circuit 12 has a MESFET 24 connecting the microstrip adjacent to the input terminal to a common reference potential, such as ground. MESFET 24 is preferably a depletion-mode FET, but also may be an enhancement-mode FET for use where high-speed switching is desirable. As with conventional FETs, FET 24 has a control terminal or gate 25 and two current conducting ports 26 and 27, that are variously referred to as source and drain, depending on the biasing applied to the FET and the resulting direction of current flow through the FET.

The gate of FET 24 is biased in part by a bias resistor $R_s$ connecting the gate to a negative voltage supply $-V$, and a capacitor C connecting the gate to ground. In some applications, C can be zero (eliminated). The gate is also coupled to microstrip 14 via a set 30 of detector diodes 31, 32, 33 and 34. These diodes are connected as shown to conduct when the microstrip is at a voltage sufficiently more positive than $-V$. Set 30 includes a first subset $D_1$ consisting of diode 31 and a second subset $D_2$ consisting of diodes 32, 33 and 34. A resistor $R_b$ having a large resistance for discharging current when the voltage on the microstrip is above the knee voltage of the diode, is connected between ground and the junction between diode subsets $D_1$ and $D_2$. If a current drain through resistor $R_b$ is not desired, it can be made infinite in resistance (eliminated); however the time required for the protection circuit to respond to an overload and the time required for the protection circuit to recover from an overload will increase.

Diode limiter circuit 22 includes two pairs 36 and 38 of Schottky diodes connected between the microstrip adjacent to output terminal 18 and ground. Pair 36 is connected to conduct when the voltage on the microstrip is positive and pair 38 is connected to conduct when the microstrip voltage is negative. These diode pairs remove power from excessive voltages that may get past the FET limiter circuit. Depending on the application and the type of excessive voltages expected to be encountered, one or both of these pairs of diodes could be eliminated.

Also, for some applications, the coil can be replaced with a transmission line, a resistor, or other passive network.

The gate of FET 24 is normally biased to pinchoff, maintaining the switch in its open state. When a high voltage CW pulse comes in, the negative peaks of its sine wave drop the potential of the microstrip below that of the negatively biased gate. Thus, both gate and ground are positive relative to the microstrip. In this instant, the MESFET behaves as if the electrode connected to the microstrip were the source and the electrode connected to ground were the drain, with the gate forward-biased for conduction. Thus, during the peak of the negative half cycle, the switch is closed, effectively shorting the input microstrip to ground.

During the positive half cycle, the detector diodes conduct, thus removing the negative bias on the gate and allowing the switch to conduct. In this manner the MESFET switch limiter clips both the positive and negative peaks. In case too much power leaks past the switch, Schottky limiter diodes, protected from the main pulse by the switch, remove the remaining energy.

Through proper choice of the values of the resistors $R_b$ and $R_s$ the number of diodes in the diode subsets $D_1$ and $D_2$, and the voltage $-V$, one can adjust the positive and negative threshold voltages for limiting by the FET limiter and can vary the quiescent bias on the diodes. In the preferred embodiment the choices are such that a small amount of forward current flows through the diodes in subset $D_2$ and the diode in subset $D_1$ is forward biased halfway toward its threshold for conduction. Consequently, the positive-voltage threshold for limiting is small, and the switching time is very short.

Figure 2:
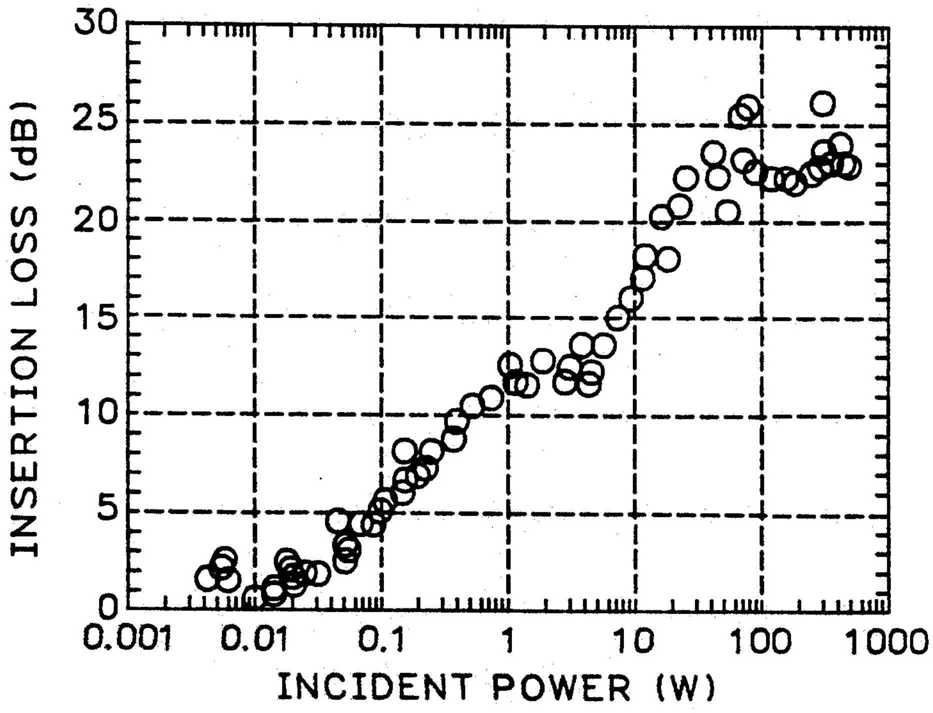
FIG. 2 is a chart of the insertion loss (isolation) of the device of FIG. 1 as a function of the power incident on the input port.

FIG. 2 shows the insertion loss due to the limiter as a function of incident power for the circuit of FIG. 1 in which FET 24 is a 250 μm low noise FET implant (LFI) FETs with an asymmetric, self-aligned gate (ASAG), $R_s$ is 2 k-ohm, $R_b$ is 1 k-ohm, diodes 31–34 are 30 μm LFI diodes with self-aligned gate, limiter circuit 22 has 180 μm LFI diodes with ASAG, and coil 20 has a value of 0.3 nH. The minimum insertion loss is about 1 dB. With a single optimization cycle this can be reduced to ½ dB over an octave. As presently configured, the limiter starts to work when the incident power reaches about 40 mW, but this can be adjusted for particular applications by modifying the design. It is even possible to make a limiter with a variable set point that would be useful for transceivers. The key point to be obtained from FIG. 2 is that, with 500 W incident on the device, the insertion loss is about 25 dB, which corresponds to an output power of only 1.6 W. This is likely to be sufficient to protect even the most sensitive MMIC from the maximum anticipated threat.

With 500 W incident on the MESFET, it is drawing an RF current of 6 amperes. This is two orders of magnitude higher than the maximum saturated current capacity of the MESFET. Hence, the MESFET is conducting in a breakdown mode at this power. At low input power levels the MESFET functions as a normal FET switch, and at high power levels the MESFET becomes a high-current short through a breakdown mechanism.

It will be apparent to one skilled in the art that variations in form and detail may be made in the preferred embodiment without varying from the spirit and scope of the invention as defined in the claims and any modification of the claim language or meaning as provided under the doctrine of equivalents. The preferred embodiment is thus provided for purposes of explanation and illustration, but not limitation.

We claim:

1. An overvoltage protection circuit comprising:

a terminal for receiving an input signal;

a transistor having a control port, a first current conducting port coupled to the terminal, and a second current conducting port coupled to a common reference potential, with a bidirectionally conductive controlled path between the first and second current-conducting ports;

first resistance means coupling the control port to a second reference potential equal to or lower than the common reference potential for rendering the transistor conductive in a first direction in response to a voltage applied to the terminal of a first polarity; and diode means coupled between the terminal and the control port for rendering the transistor conductive in a second direction reverse to the first direction in response to a voltage applied to the terminal of a second polarity opposite to the first polarity.

2. A protection circuit according to claim 1 wherein the diode means includes first and second diodes connected in series and a second resistance means connected from between the first and second diodes to the common reference potential.

3. A protection circuit according to claim 1 further comprising capacitance means connecting the control port to the common reference potential.

4. A protection circuit according to claim 1 wherein the transistor is a depletion-mode MESFET.

5. An overvoltage protection circuit for limiting the voltage input to a GaAs integrated circuit comprising:

an input terminal for receiving an input signal for the integrated circuit;

an output terminal for coupling to the integrated circuit;

a depletion-mode MESFET having a control port, a first current conducting port connected to the input terminal, and a second current conducting port connected to a common reference potential, with a bidirectionally conductive controlled path between the first and second current-conducting ports;

first resistance means coupling the control port to a negative reference potential lower than the common reference potential for rendering the transistor conductive in a first direction in response to a negative voltage applied to the input terminal;

detector diode means coupled between the input terminal and the control port for rendering the transistor conductive in a second direction reverse to the first direction in response to a positive voltage applied to the input terminal;

coil means in series between the input terminal and the output terminal; and diode limiter means connected to the output terminal for limiting the voltage of at least a first polarity applied to the output terminal that passes the MESFET.

6. A protection circuit according to claim 5 wherein the detector diode means includes first and second diodes connected in series and a second resistance means connected from between the first and second diodes to the common reference potential.

7. A protection circuit according to claim 5 further comprising capacitance means connecting the control port to the common reference potential.

8. A protection circuit according to claim 5 wherein the diode limiter means comprise Schottky diodes.

* * * * *